June 13, 1933.  C. G. CLEMENT  1,913,698

TANDEM AXLE

Filed April 23, 1930  2 Sheets-Sheet 1

Witness
N. F. McHught

Inventor
Charles G. Clement.
by
his Attorneys

June 13, 1933.  C. G. CLEMENT  1,913,698
TANDEM AXLE
Filed April 23, 1930  2 Sheets-Sheet 2
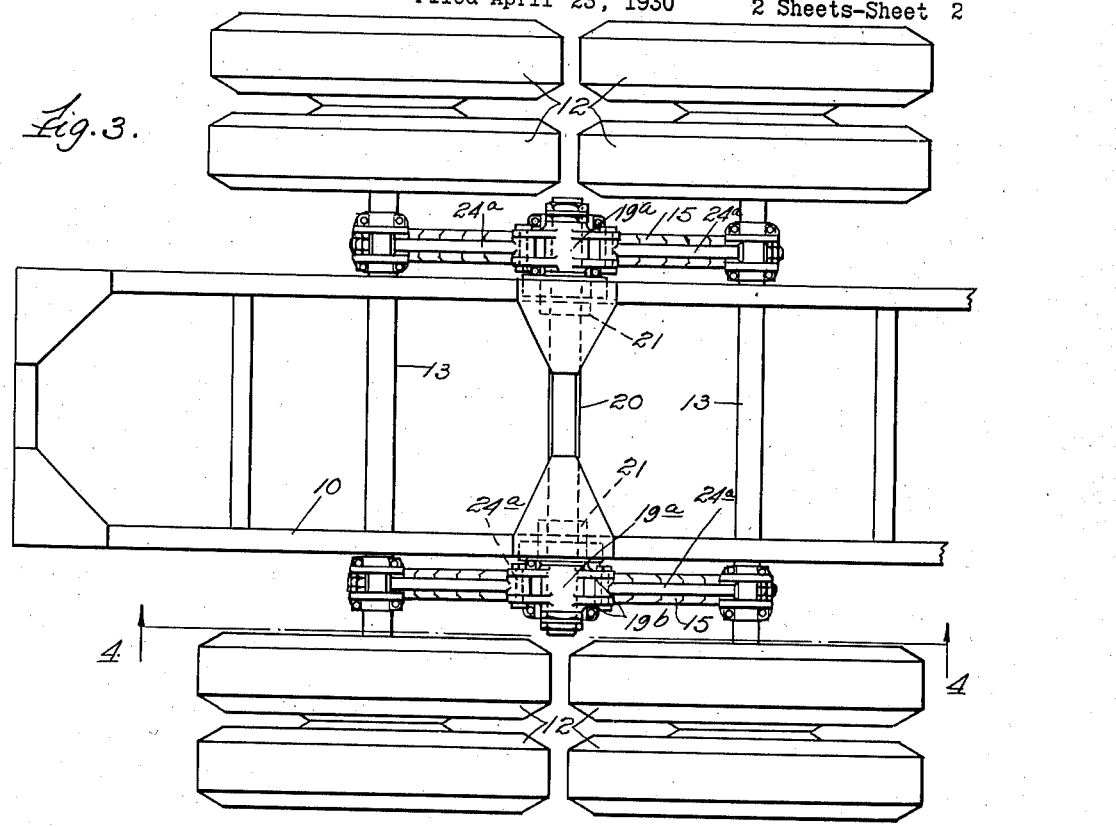
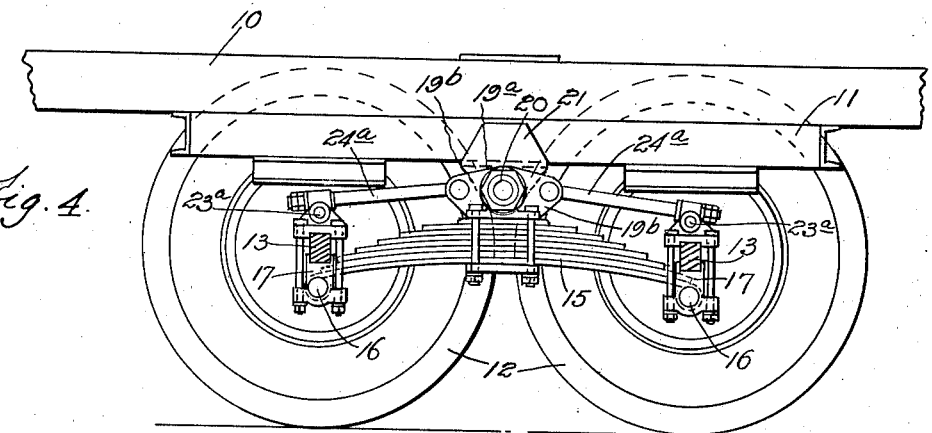
Inventor
Charles G. Clement.
by Bowton & Bowton
his Attorneys.

Patented June 13, 1933

1,913,698

UNITED STATES PATENT OFFICE

CHARLES G. CLEMENT, OF EDGERTON, WISCONSIN, ASSIGNOR TO HIGH-WAY TRAILER COMPANY, OF EDGERTON, WISCONSIN, A CORPORATION OF WISCONSIN

TANDEM AXLE

Application filed April 23, 1930. Serial No. 446,756.

This invention relates to vehicles, and more particularly to vehicles of the trailer type, and has for an object to provide an improved trailer structure especially suited for heavy duty service, constructed with two sets of road engaging wheels arranged in tandem and mounted for rocking about a transverse axis to accommodate themselves to road-bed irregularities, and to distribute the load over a relatively large area, thus reducing to a minimum the effective load per unit of engaged road surface. Another object is to provide in a vehicle of the character mentioned an improved spring mounting for two sets of wheels arranged in tandem relation. A further object is to provide an improved radius rod arrangement connected to the respective sets of wheels which are arranged in tandem. It consists of certain elements and features of construction in combination, as herein shown and described and as indicated by the claims.

In the drawings:—

Figure 3 is a plan view of the rear end of a trailer, embodying a modified form of my invention.

Figure 4 is a view substantially in elevation taken at line, 4—4, on Figure 3.

Referring now in detail to the drawings, 10 represents the main frame of a trailer vehicle to which is rigidly connected an under or sub-frame, 11, serving as the supporting structure for two sets of road-engaging wheels, 12, arranged in tandem relation, on a pair of longitudinally spaced axles, 13. At the opposite sides of the frame structure are longitudinally extending leaf springs, 15, the ends of which are pivotally connected at 16, to brackets, 17, rigidly secured on the axles, adjacent the wheels, with the pivot connections disposed below said axles. These springs thus serve to tie the two pairs of road-engaging wheels yieldingly together and allow up-and-down movement of the wheels with respect to each other to accommodate road-bed irregularities. The springs are engaged adjacent their longitudinal centers by saddle brackets, 19, which are loosely journaled on the outer ends of a transversely extending pivot shaft, 20, which is disposed above the common axes of the wheels, and which is carried in supporting brackets, 21, connected to the sides of the sub-frame structure, 11. Thus the two pairs of road-engaging wheels may rock as a unit about the axis of this transverse pivot shaft, 20.

Figure 1:
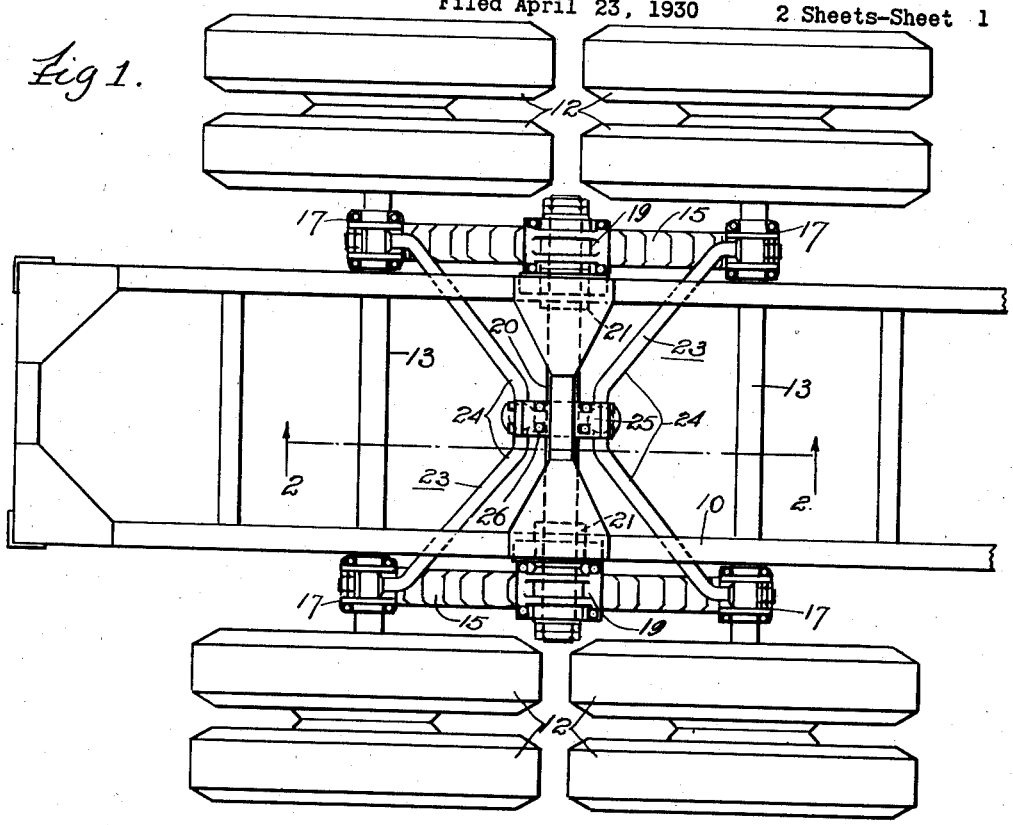
Figure 1 is a plan view of the rear end of a trailer vehicle, showing the supporting wheel structure embodying the present invention.

The brackets, 17, on the axles adjacent the wheels are formed so as to provide above the axles, 13, pivot connections, 22, for radius elements, 23; and as may be seen in Figure 1 these radius elements are two in number arranged in opposite relation and each formed of a single member with two diverging radius arms, 24, at whose junction is provided a ball, 25, which is journaled in a co-operative socket formed in a bracket, 26. This bracket is fixed substantially at the middle of the frame, 10, being shown as rigidly secured adjacent the longitudinal center of the pivot shaft, 20. The ball and socket connection of the radius elements thus permits universal movement to a limited extent so as to accommodate the wheels to road-bed irregularities and permit the flexure of the adjacent portions of the leaf springs as well as accommodating differences in vertical movement of the respective wheels relatively to each other. This construction insures the additional advantage of distributing the load over a relatively large area so that the effective load per unit of engaged road surface is relatively small.

In the modified construction shown in Figures 3 and 4 the saddle brackets, 19$^a$, for the leaf springs, 15, are loosely mounted on the ends of the pivot shaft, 20, and are formed with two pair of up-standing lugs, 19$^b$, to which are pivotally connected the radius rods, 24$^a$, shown as individual members arranged above and in substantial alignment with the respective leaf springs, and with their outer ends pivoted in the brackets, 17, as indicated at 23ª.

Figure 2:
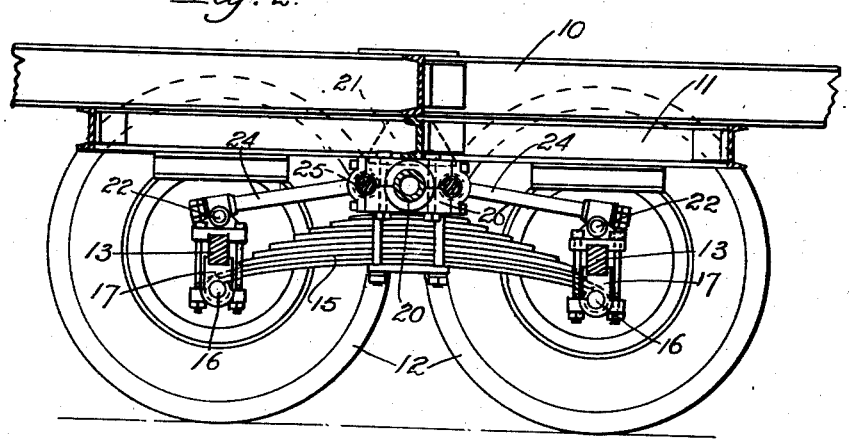
Figure 2 is a vertical sectional view taken substantially as indicated at line, 2—2, on Figure 1.

This modified construction has many of the advantages of the construction shown in Figures 1 to 2 and it will be manifest that the radius rods are arranged so as to assist in directly transmitting the stresses from the vehicle frame structure to the axles or vice versa, while fully accommodating the entire range of flexure of the leaf springs. By reason of the saddle, 19ª, of the springs, being mounted on the pivot shaft, 20, the road engaging wheels at each side are permitted to rock as a unit about the axis of the pivot shaft.

I claim:—

1. In a vehicle, the combination of a frame, two pairs of road-engaging wheels arranged in tandem relation; and fixed axles on which the wheels are individually journalled a pair of longitudinally extending leaf springs disposed adjacent opposite sides of the frame and having their ends positively connected to one side of the fixed axles adjacent the wheels, means engaging intermediate portions of the springs and pivotally connected to the frame, a pair of oppositely disposed radius elements each including a pair of laterally diverging arms, acting as a continuous member having their remote ends connected in spaced relation to the fixed axle at the side opposite said spring connection, and means mounted adjacent the longitudinal center of the frame engaging each of said radius elements adjacent the junction of its arms for providing a universal connection whereby to permit said radius elements to freely swivel in accommodating the individual flexure of the corresponding spring portions.

2. In a vehicle, the combination of a frame, two pairs of road-engaging wheels arranged in tandem relation; and fixed axles on which the wheels are individually journalled, a pair of longitudinally extending leaf springs disposed adjacent opposite sides of the frame, the ends of said springs being pivotally connected to the under side of said fixed axles adjacent the wheels, means engaging intermediate portions of the springs and pivotally connected to the frame, a pair of oppositely disposed radius elements each including a pair of laterally diverging arms, acting as a continuous member having their remote ends connected in spaced relation to the upper side of the fixed axle at the side opposite said spring connection, and means mounted adjacent the longitudinal center of the frame engaging each of said radius elements adjacent the junction of its arms for providing a universal connection whereby to permit said radius elements to freely swivel in accommodating the individual flexure of the corresponding spring portions.

3. In a road vehicle in combination with a rigid frame, two pairs of wheels in tandem relation; a rigid non-rotatably mounted axle-in-common for the wheels of each pair, a pair of leaf springs and mounting means for said springs comprising a transversely extending pivot member carried by the frame, and mounts rigidly secured to the springs respectively at a middle part of their length and pivotally engaged with said pivot member, each of said springs being connected positively at its opposite ends with the ends of the axles at the side of the vehicle at which the spring is mounted, and radius rods pivotally connected to the mounting means and to the respective fixed axles, the radius rods having their pivotal connection to the mounting means at an intermediate part of the length of the pivot member of said mounting means.

4. In a road vehicle in combination with a rigid frame, two pairs of wheels in tandem relation; a rigid non-rotatably mounted axle-in-common for the wheels of each pair, a pair of leaf springs and mounting means for said springs comprising a transversely extending pivot member carried by the frame, and mounts rigidly secured to the springs respectively at a middle part of their length and pivotally engaged with said pivot member, each of said springs being connected positively at its opposite ends with the ends of the axles at the side of the vehicle at which the spring is mounted, and radius rods pivotally connected to the mounting means and to the respective fixed axles, the radius rods having their pivotal connection to the mounting means by ball-and-socket joints at an intermediate part of the length of the pivot member of the mounting means.

CHARLES G. CLEMENT.